B1

United States Patent
Kelly

(10) Patent No.: US 10,119,641 B1
(45) Date of Patent: Nov. 6, 2018

(54) FLEXIBLE PIPE CONNECTOR

(71) Applicant: James M. Kelly, Elma, NY (US)

(72) Inventor: James M. Kelly, Elma, NY (US)

( * ) Notice: Subject to any disclaimer, the term of this patent is extended or adjusted under 35 U.S.C. 154(b) by 73 days.

(21) Appl. No.: 15/369,022

(22) Filed: Dec. 5, 2016

(51) Int. Cl.
*F16L 27/06* (2006.01)
*F16L 47/18* (2006.01)

(52) U.S. Cl.
CPC .............. *F16L 27/06* (2013.01); *F16L 47/18* (2013.01)

(58) Field of Classification Search
CPC ............ F16L 27/06; F16L 27/04; F16L 47/18
USPC .......... 285/146.1, 146.2, 261, 263, 270, 271
See application file for complete search history.

(56) References Cited

U.S. PATENT DOCUMENTS

| | | | |
|---|---|---|---|
| 1,451,800 A | | 4/1923 | Agner |
| 1,665,810 A | * | 4/1928 | Gillick .................. 285/146.1 X |
| 1,925,335 A | * | 9/1933 | Murphy .................. F16L 27/06 285/146.1 X |
| 2,220,120 A | * | 11/1940 | Plummer ................ F16L 27/04 285/271 X |
| 3,887,221 A | * | 6/1975 | Young |
| 3,997,197 A | | 12/1976 | Marsh et al. |
| 4,049,480 A | * | 9/1977 | Kutschke |
| 4,154,551 A | * | 5/1979 | Petrie ...................... F16L 27/04 285/271 X |
| 4,946,202 A | | 8/1990 | Perricone |
| 5,368,342 A | | 11/1994 | Latham et al. |
| 8,833,802 B2 | | 9/2014 | Morris |
| 8,944,472 B2 | | 2/2015 | Stobbart |
| 9,360,141 B2 | | 6/2016 | Menheere |
| 2005/0012329 A1 | | 1/2005 | Brown |
| 2011/0121564 A1 | | 5/2011 | Kaplan |
| 2013/0168957 A1 | | 7/2013 | Kaplan |
| 2015/0001842 A1 | | 1/2015 | Jones et al. |

FOREIGN PATENT DOCUMENTS

JP        54028015        3/1979

* cited by examiner

*Primary Examiner* — Greg Binda
*Assistant Examiner* — Zachary T Dragicevich
(74) *Attorney, Agent, or Firm* — Simpson & Simpson PLLC

(57) ABSTRACT

A flexible pipe connector, including a tubular housing, a sleeve arranged within the tubular housing, the sleeve including a first end having a first spherical inner surface, the first spherical inner surface having a first inner radius, and a second end having a second spherical inner surface, the second spherical inner surface having a second inner radius, a first tubular member including a first spherical end and a first cylindrical end, the first spherical end having a first outer radius, smaller than the first inner radius, the first spherical end pivotably arranged in the first end, and a second tubular member including a second spherical end and a second cylindrical end, the second spherical end having a second outer radius, smaller than the second inner radius, the second spherical end pivotably arranged in the second end.

9 Claims, 5 Drawing Sheets

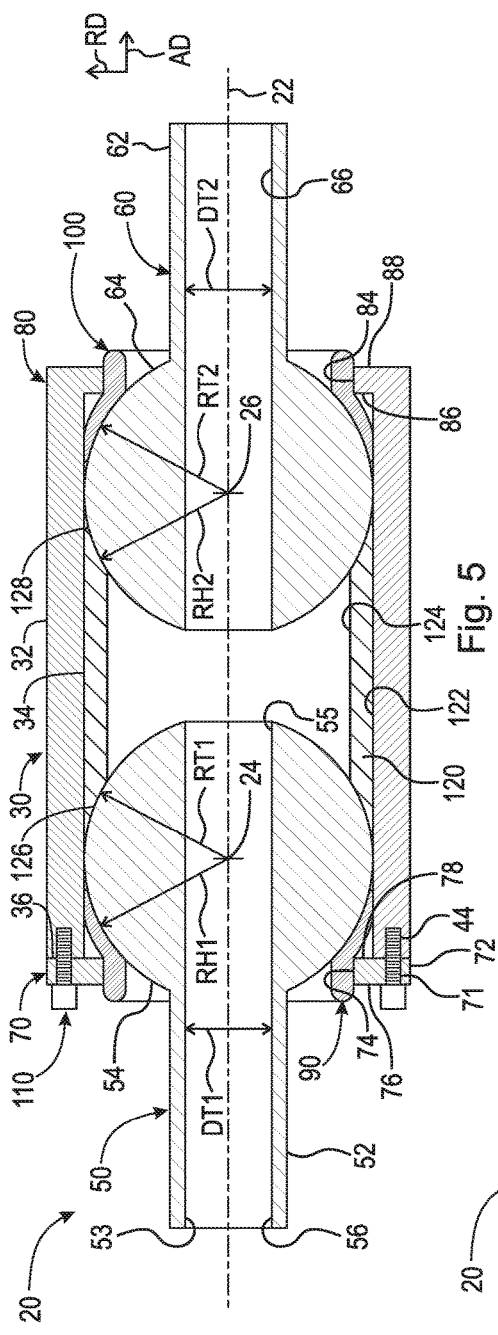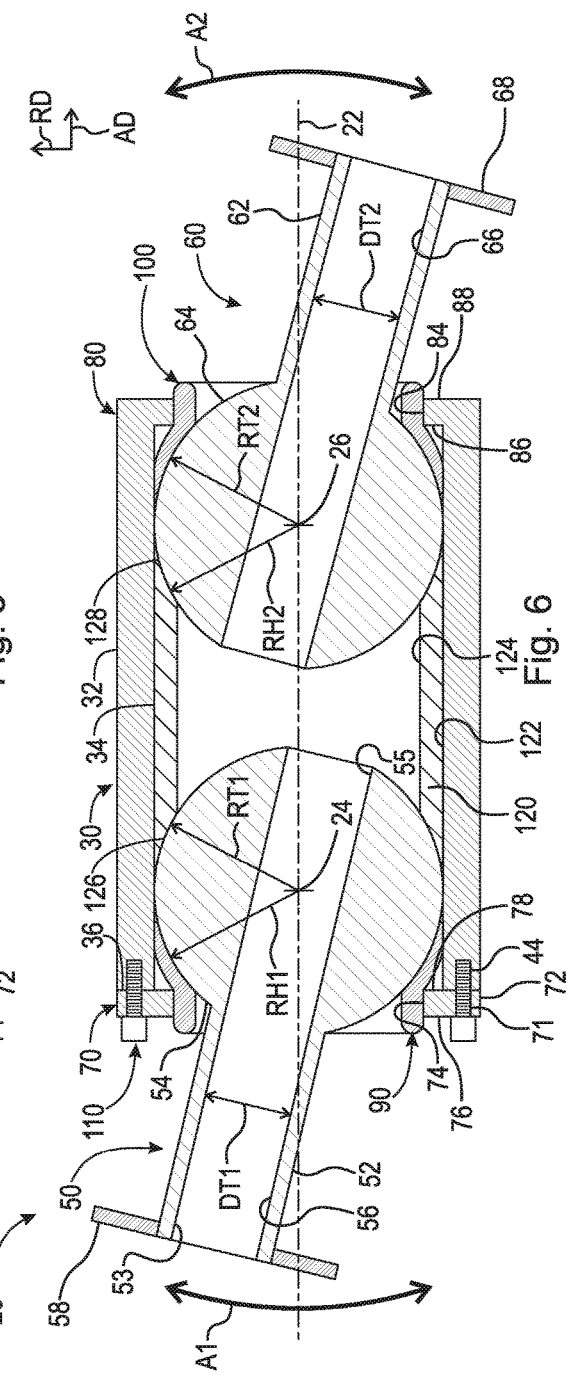

FLEXIBLE PIPE CONNECTOR

FIELD

The present invention relates generally to a flexible pipe connector for connecting two misaligned fluid conduits, and more specifically relates to a ball and socket misalignment flange that includes an internal sleeve to prevent leaks.

BACKGROUND

An integral part of modern day infrastructure is the vast network of pipelines, conduits, and culverts in North America. These are among the assets we take for granted, since most are buried and we never see them. Underground pipelines, i.e., gas lines, sewer lines, and water mains, are generally considered to be high quality and durable but do not have an unlimited life expectancy. Many pipes have been functioning well for fifty years, or longer, but inspection of the interiors of these systems often reveals misaligned pipe segments, leaking joints, or other failing pipe integrity. Underlying causes of pipe misalignment can be linked to tree root incursion and soil shifting. This tends to be more of a problem in the winter, as the tree roots go deeper into the unfrozen soil in search of moisture. Additionally, pipe structures in manufacturing facilities and plants, such as steam lines, often need to be replaced or repositioned. These pipe structures may be misaligned or require repositioning in a non-aligned system.

If there is considerable erosion or shifting, leakage may occur. Continued leakage allows exfiltration of the contents of the flow steam that eventually leads to extensive property damage or water source pollution. Also, in many cases, the contents of the flow stream are valuable enough that their loss through exfiltration becomes another economic factor. Additionally, clay and debris can easily run into the pipe and block them up requiring immediate repair. Pipes that are severely misaligned usually require substantial repair work, namely, excavating, realigning, and reconnecting the two disjoined pipe sections with a straight collar or sleeve.

To avoid the costs associated with excavation and repair, ball and socket type flanges are commonly used to join two misaligned pipe ends that may transport various fluids.

Thus, there is a long-felt need for a flexible pipe connector with a wide range of flexible motion such that two misaligned pipes can be reconnected with minimal excavation and repair cost.

SUMMARY

According to aspects illustrated herein, there is provided a flexible pipe connector, comprising a tubular housing, a sleeve arranged within the tubular housing, the sleeve including a first end having a first spherical inner surface, the first spherical inner surface having a first inner radius, and a second end having a second spherical inner surface, the second spherical inner surface having a second inner radius, a first tubular member including a first spherical end and a first cylindrical end, the first spherical end having a first outer radius, smaller than the first inner radius, the first spherical end pivotably arranged in the first end, and a second tubular member including a second spherical end and a second cylindrical end, the second spherical end having a second outer radius, smaller than the second inner radius, the second spherical end pivotably arranged in the second end.

According to aspects illustrated herein, there is provided a flexible pipe connector, comprising a tubular housing, a sleeve arranged within the tubular housing, the sleeve including a first end having a first spherical inner surface, the first spherical inner surface having a first inner radius, and a second end having a second spherical inner surface, the second spherical inner surface having a second inner radius, a first tubular member including a first spherical end and a first cylindrical end, the first spherical end having a first outer radius, smaller than the first inner radius, the first spherical end pivotably arranged in the first end, a second tubular member including a second spherical end and a second cylindrical end, the second spherical end having a second outer radius, smaller than the second inner radius, the second spherical end pivotably arranged in the second end.

According to aspects illustrated herein, there is provided a flexible pipe connector, comprising a tubular housing including an open end and a closed end, the closed end having a first flange, a sleeve arranged within the tubular housing, the sleeve including a first end having a first spherical inner surface, the first spherical inner surface having a first inner radius, and a second end having a second spherical inner surface, the second spherical inner surface having a second inner radius, a first tubular member including a first spherical end and a first cylindrical end, the first spherical end having a first outer radius, smaller than the first inner radius, the first spherical end pivotably arranged in the first end, a second tubular member including a second spherical end and a second cylindrical end, the second spherical end having a second outer radius, smaller than the second inner radius, the second spherical end pivotably arranged in the second end, and a second flange removably connected to the open end.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 5 is a cross-sectional view of the flexible pipe connector taken generally along line 5-5 in FIG. 2; and, FIG. 6 is a cross-sectional view of the flexible pipe connector taken generally along line 6-6 in FIG. 2 with the flexible pipe connector in a non-aligned position.

DETAILED DESCRIPTION OF EMBODIMENTS

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, and/or pneumatics.

It should be appreciated that the term "substantially" is synonymous with terms such as "nearly," "very nearly," "about," "approximately," "around," "bordering on," "close to," "essentially," "in the neighborhood of" "in the vicinity of" etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

By "non-rotatably connected" elements, we mean that: the elements are connected so that whenever one of the elements rotate, all the elements rotate; and relative rotation between the elements is not possible. Radial and/or axial movement of non-rotatably connected elements with respect to each other is possible, but not required.

Figure 1:
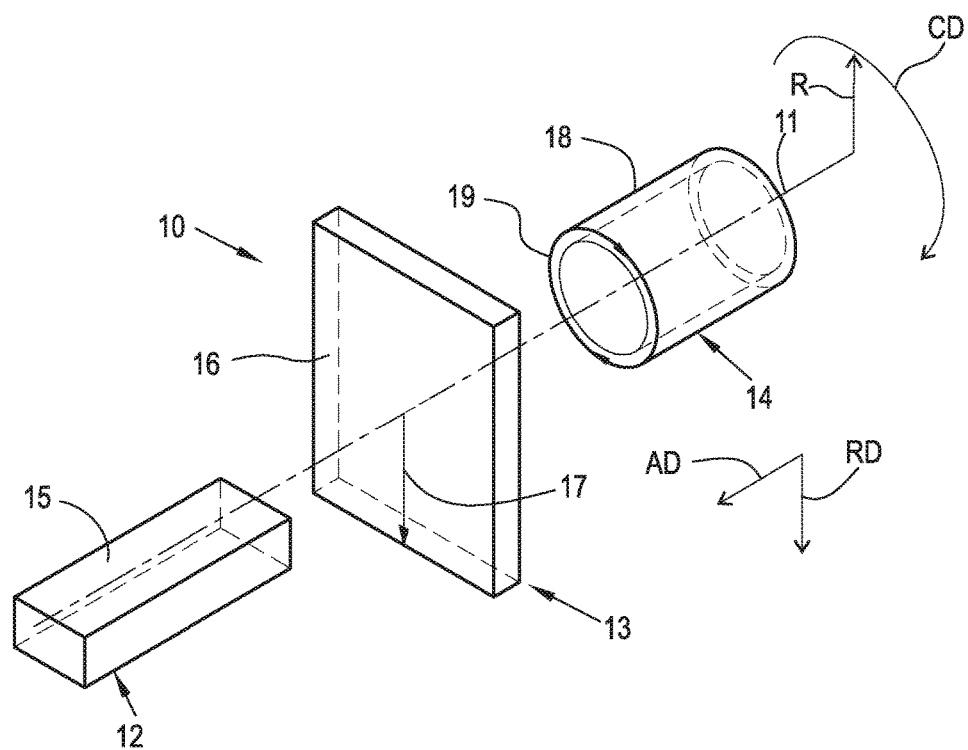
FIG. 1 is a perspective view of a cylindrical coordinate system demonstrating spatial terminology used in the present application.

Adverting now to the figures, FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Figure 2:
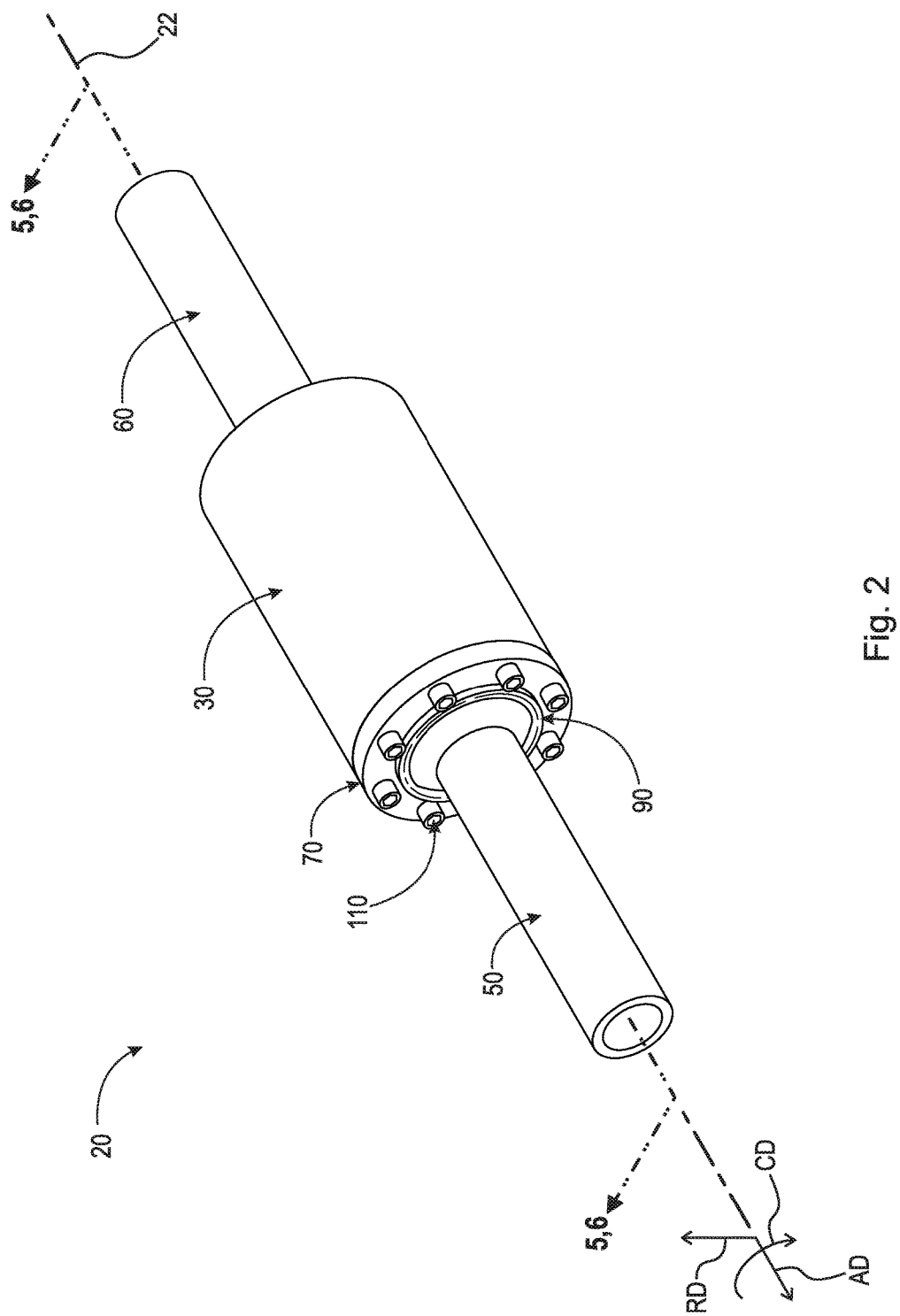
FIG. 2 is a top perspective view of a flexible pipe connector in an aligned position.

FIG. 2 is a top perspective view of flexible pipe connector 20 in an aligned position. Flexible pipe connector 20 generally comprises housing 30, tubular member 50, tubular member 60, flange 70, flange 80 (shown in FIGS. 5 and 6), liner 90, liner 100 (not shown), and sleeve 120. For the purposes of this description, longitudinal axis 22 is an imaginary axis that runs through the radial center of housing 30 (i.e., housing 30 is concentrically arranged around longitudinal axis 22). By an aligned position it is meant that the components of flexible pipe connector 20, namely tubular member 50 and tubular member 60, are concentrically arranged around longitudinal axis 22. Flange 70 secures tubular member 50 and liner 90 to housing 30. Flange 70 is coupled to housing 30 by, for example, one or more bolts 110. Flange 80 secures tubular member 60 and liner 100 (not shown) to housing 30. Flange 80 is coupled to housing 30. In this exemplary embodiment, flange 80 is an integral part of housing 30 (i.e., flange 80 is machined into housing 30). In an example embodiment, flange 80 is a separate component coupled to housing 30 by one or more bolts. In an example embodiment, flange 80 is a separate component welded to housing 30. It should be appreciated, however, that any other suitable means for connecting flanges 70 and 80 to housing 30 such that tubular members 50 and 60, respectively, and liners 90 and 100, respectively, are secured therein can be used (e.g., screws, rivets, clamps, epoxy, welding, or any other coupling device known to those having ordinary skill in the art).

Figure 3:
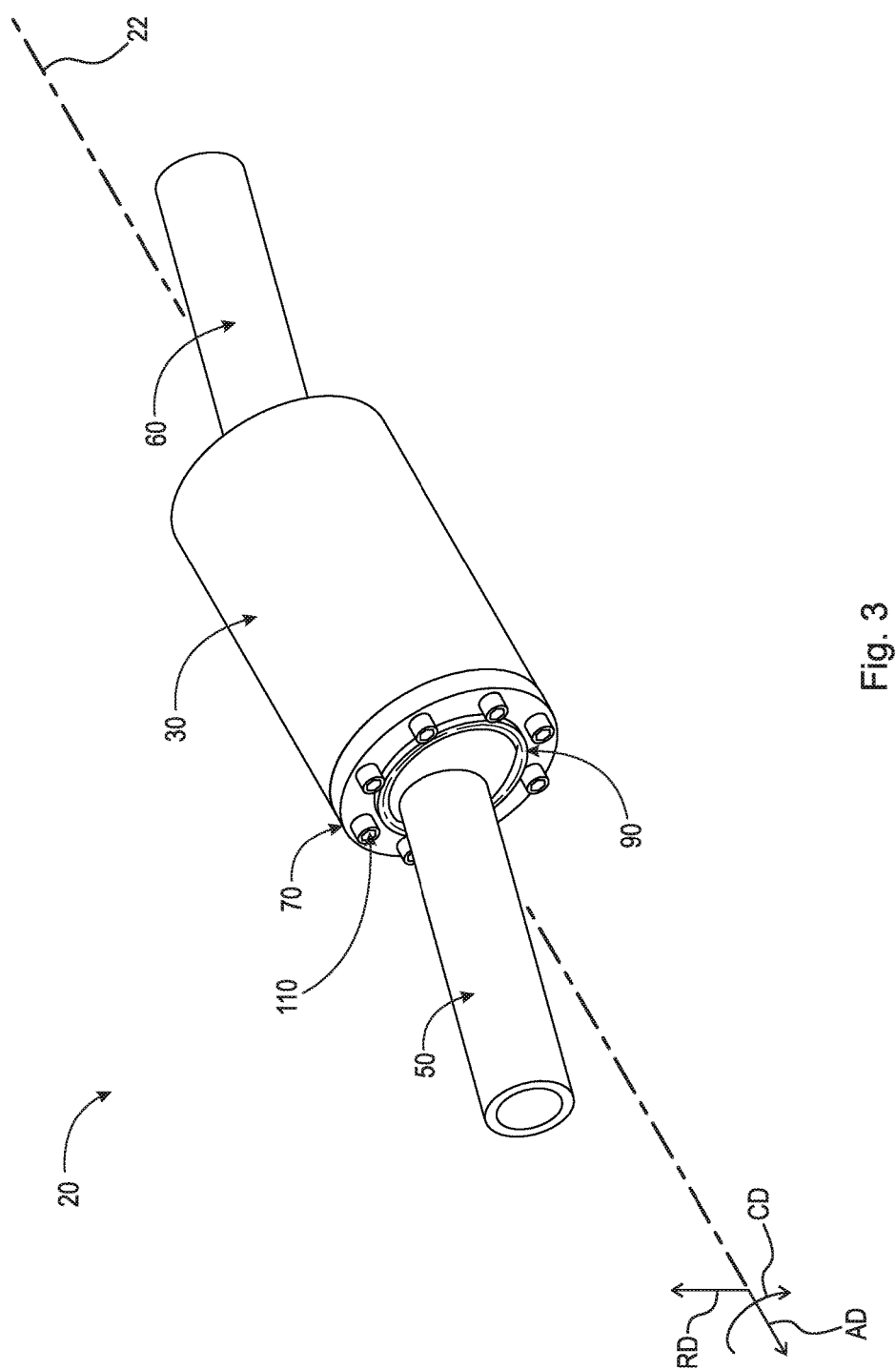
FIG. 3 is top perspective view of the flexible pipe connector in FIG. 3 in a non-aligned position.

FIG. 3 is top perspective view of flexible pipe connector 20, as shown in FIG. 3, but in a non-aligned position. By a non-aligned position it is meant that the components of flexible pipe connector 20, namely tubular member 50 and/or tubular member 60, are not concentrically arranged around longitudinal axis 22. The arrangement of tubular member 50, when secured in housing 30 by flange 70 and sleeve 120, is similar to a ball and socket joint, and allows tubular member 50 to move angularly relative to housing 30. Thus, similar to the effect of a universal joint, tubular member 50 is pivotably bendable relative to housing 30 in radial direction RD. Tubular member 50 is also rotatable in circumferential direction CD relative to housing 30. Similarly, the arrangement of tubular member 60, when secured in housing 30 by flange 80 and sleeve 120, is similar to a ball and socket joint, and allows tubular member 60 to move angularly relative to housing 30. Thus, similar to the effect of a universal joint, tubular member 60 is pivotably bendable relative to housing 30 in radial direction RD. Tubular member 60 is also rotatable in circumferential direction CD relative to housing 30. Thus, it can be said that tubular members 50 and 60 are rotatably secured in housing 30 by flanges 70 and 80, respectively, and sleeve 120.

Figure 4:
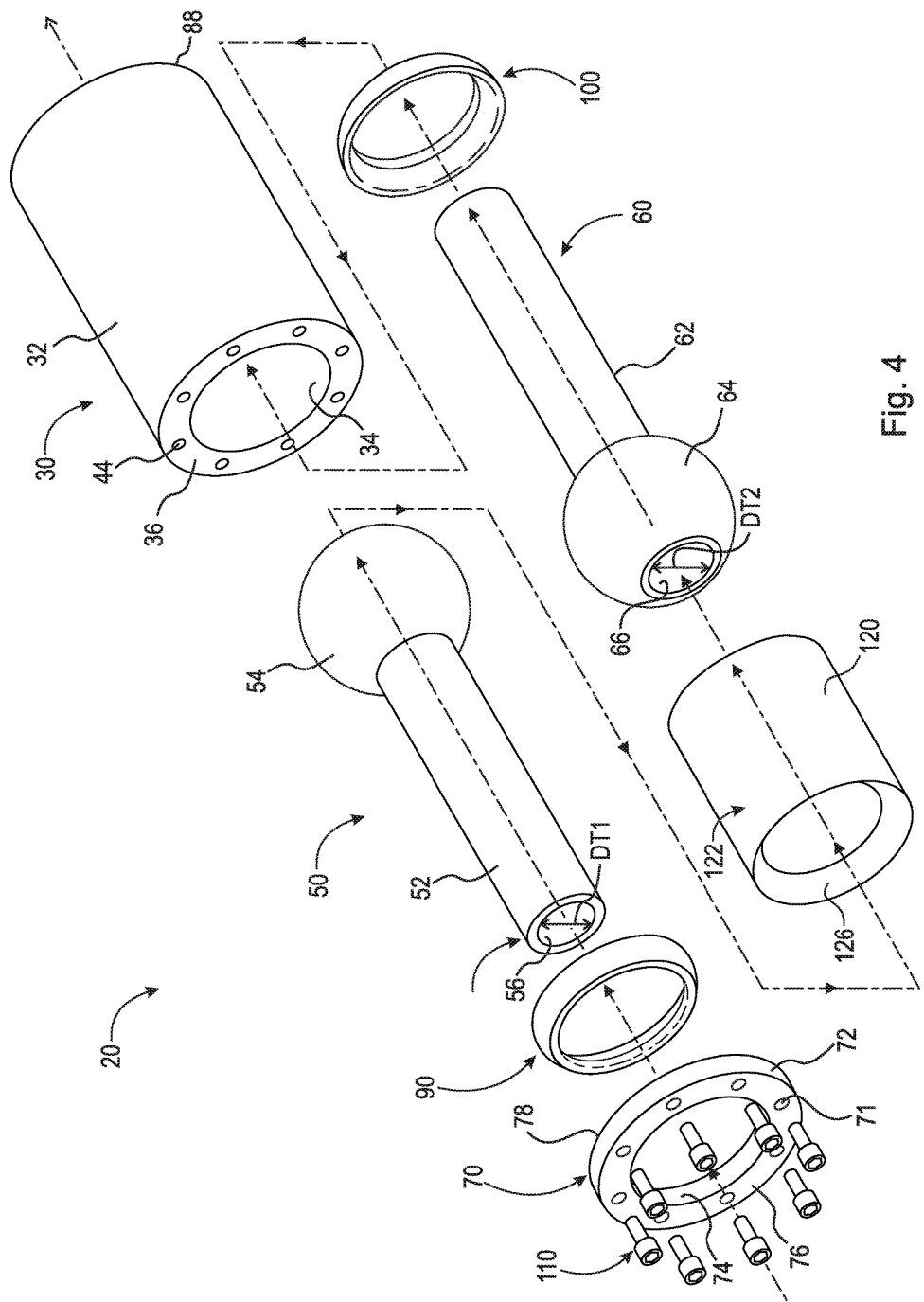
FIG. 4 is an exploded top perspective view of the flexible pipe connector in FIG. 2.

FIG. 4 is an exploded top perspective view of flexible pipe connector 20, as shown in FIG. 2. Housing 30 comprises outer surface 32, inner surface 34 (not shown), and radial surface 36. In this exemplary embodiment, outer surface 32 and inner surface 34 are annular surfaces having constant radial dimensions about longitudinal axis 22. Radial surface 36 comprises one or more holes 44 arranged circumferentially therein.

Sleeve 120 comprises outer surface 122, inner surface 124, and inner surfaces 126 and 128. In this exemplary embodiment, outer surface 122 and inner surface 124 are annular surfaces having constant radial dimensions about longitudinal axis 22. Inner surfaces 126 and 128 are annular surfaces having variable radial dimensions about longitudinal axis 22. Sleeve 120 fits snuggly within housing 30 such that outer surface 122 abuts inner surface 34. In an example embodiment, sleeve 120 comprises Ultra High Molecular Weight (UHMW) polyethylene plastic.

Tubular member 50 comprises cylindrical end 52, spherical end 54, and inner surface 56. Cylindrical end 52 is generally a tube (e.g., a pipe) having inner surface 53, which has diameter DT1. Spherical end 54 is generally a solid sphere comprising through-bore 55, which has diameter DT1. Cylindrical end 52 is connected to spherical end 54 such that inner surface 53 and through-bore 55 are aligned. Cylindrical end 52 may be connected to spherical end 54 by, for example, welding or other techniques known in the art. When cylindrical end 52 and spherical end 54 are connected, inner surface 53 and through-bore 55 form inner surface 56, which thus has diameter DT1. It should be appreciated, however, that tubular member 50 can be machined as one single component.

Tubular member 60 comprises cylindrical end 62, spherical end 64, and inner surface 66. Cylindrical end 62 is generally a tube (e.g., a pipe) having inner surface 63, which has diameter DT2. Spherical end 64 is generally a solid sphere comprising through-bore 65, which has diameter DT2. Cylindrical end 62 is connected to spherical end 64 such that inner surface 63 and through-bore 65 are aligned. Cylindrical end 62 may be connected to spherical end 64 by, for example, welding or other techniques known in the art. When cylindrical end 62 and spherical end 64 are connected, inner surface 63 and through-bore 65 form inner surface 66, which thus has diameter DT2. It should be appreciated, however, that tubular member 60 can be machined as one single component.

Flange 70 is an annular ring comprising outer surface 72, inner surface 74, radial surface 76, and radial surface 78. In this exemplary embodiment, flange 70 further comprises one or more through-bores 71 extending from radial surface 76 to radial surface 78. Radial surface 78 abuts against radial surface 36 and through-bores 71 align with holes 44. Flange 70 is secured to housing 30 via bolts 110, which are fed through through-bores 71 and secured in holes 44, for example by a threaded connection. It should be appreciated that radial surface 78 does not need to abut against radial surface 36, but rather flange 70 may be secured to housing 30 with an axial space there between. Housing 30 comprises flange 80 machined thereon. Flange 80 (shown in FIGS. 5 and 6) is generally an annular ring comprising inner surface 84, radial surface 86, and radial surface 88.

Liner 90 is an annular gasket general arranged concentrically within inner surface 74. Liner 100 is an annular gasket generally arranged concentrically within inner surface 84. In an example embodiment, liners 90 and 100 comprise TEFLON™ material.

In this exemplary embodiment, liner 100 is inserted into housing 30 and abuts against flange 80 (not shown). Then tubular member 60 is inserted into housing 30, cylindrical end 62 first. Then sleeve 120 is inserted into housing 30 such that inner surface 128 (shown in FIGS. 5 and 6) abuts spherical end 64. Then tubular member 50 is inserted into housing 30, spherical end 54 first. Then liner is inserted into housing 30. Finally flange 70 is secured to housing 30 via bolts 110.

FIG. 5 is a cross-sectional view of flexible pipe connector 20 taken generally along line 5-5 in FIG. 2. Spherical end 54 is secured in housing 30 by flange 70 and bolts 110. Spherical end 54 has outer radius RT1. Inner surface 126 of sleeve 120 has inner radius RH1, measured from pivot point 24. Pivot point 24 represents the center point of the ball and socket joint created by tubular member 50, sleeve 120, and housing 30. Thus, tubular member 50 is pivotable in radial direction RD about pivot point 24. Outer radius RT1 is less than RH1 forming a clearance fit between spherical end 54, sleeve 120, and housing 30. Inner surface 74 may have a constant radial dimension, but preferably has a variable radial dimension. For example, inner surface 74 may have a variable radial dimension such that, when secured to housing 30, it is a partial spherical inner surface with a radius, measured from pivot point 24, equal to radius RH1. Thus, spherical end 54 is secured in each axial direction by a spherical inner surface having radius RH1. This provides a ball and socket joint with a more precise clearance fit and minimizes axial and radial movement of spherical end 54. Liner 90 is tightly arranged between flange 70 and spherical end 54. When flange 70 is secured to housing 30, radial surface 78 presses liner 90 tightly against spherical end 54 creating a seal that is, for example, watertight and airtight.

Spherical end 64 is secured in housing 30 by flange 80. Spherical end 64 has outer radius RT2. Inner surface 128 of sleeve 120 has inner radius RH2, measured from pivot point 26. Pivot point 26 represents the center point of the ball and socket joint created by tubular member 60, sleeve 120, and housing 30. Thus, tubular member 60 is pivotable in radial direction RD about pivot point 26. Outer radius RT2 is less than RH2 forming a clearance fit between spherical end 64, sleeve 120, and housing 30. Inner surface 84 may have a constant radial dimension, but preferably has a variable radial dimension. For example, inner surface 84 may have a variable radial dimension such that, when secured to housing 30, is a partial spherical inner surface with a radius, measured from pivot point 26, equal to radius RH2 Thus, spherical end 64 is secured in each axial direction by a spherical inner surface having radius RH2 This provides a ball and socket joint with a more precise clearance fit that minimizes axial and radial movement of spherical end 64. Liner 100 is tightly arranged between flange 80 and spherical end 64. When spherical end 64 is secured in housing 30, liner 100 is arranged tightly between radial surface 86 and spherical end 64 creating a seal that is, for example, watertight and airtight.

FIG. 6 is a cross-sectional view of flexible pipe connector 20 taken generally along line 6-6 in FIG. 2, but in a non-aligned position. Tubular members 50 and 60 are pivotably movable in radial direction RD. Tubular member 50 is moveable about pivot point 24 as shown by arrow A1. Tubular member 60 is moveable about pivot point 26, as shown by arrow A2. Additionally, tubular members 50 and 60 may further comprise connection flanges 58 and 68, respectively, concentrically arranged thereon. Connection flanges 58 and 68 are operatively arranged to connect tubular members 50 and 60, respectively, to the corresponding non-aligned pipes. Connection flanges 58 and 68 may, for example, have one or more axial through-bores concentrically arranged therein for easy connection to flanges of the corresponding non-aligned pipes.

Tubular members 50 and 60 are generally shown in the figures to have the same dimensions. However, tubular members 50 and 60 can differ in dimensions. Flexible pipe connector is designed to connect two pipes that are not axially aligned. For example, if a water main pipe breaks due to shearing forces from the ground, the two ends of the broken pipe will likely be forced out of axial alignment. In this case, the water main pipe will likely be of a uniform size (i.e., inner diameter). Thus, tubular members 50 and 60 would have the same dimensions as the broken water main pipe (i.e., DT1 is equal to DT2). However, if two different sized pipes need to be connected but are not axially aligned, tubular members 50 and 60 can have dimensions to correspond to the respective pipes (i.e., DT1 is less than DT2). In such scenario, the dimensions of the components of flexible pipe connecter 20, specifically housing 30 including outer radii RT1 and/or RT2 and inner radii RH1 and/or RH2, can be adjusted accordingly.

Thus it is seen that the objects of the invention are efficiently obtained, although changes and modifications to the invention should be readily apparent to those having ordinary skill in the art, which changes would not depart from the spirit and scope of the invention as claimed.

LIST OF REFERENCE NUMERALS

10 Cylindrical coordinate system
11 Longitudinal axis
12 Object
13 Object
14 Object
15 Axial surface
16 Radial surface
17 Radius
18 Surface
19 Circumference
AD Axial direction
CD Circumferential direction
RD Radial direction
20 Flexible pipe connector
22 Longitudinal axis
24 Pivot point
26 Pivot point
30 Housing
32 Outer surface
34 Inner surface
36 Radial surface
44 Holes
50 Tubular member
52 Cylindrical end
53 Inner surface
54 Spherical end
55 Through-bore
56 Inner surface
58 Connection flange
60 Tubular member
62 Cylindrical end
63 Inner surface
64 Spherical end
65 Through-bore
66 Inner surface
68 Connection flange
70 Flange
71 Through-bores
72 Outer surface
74 Inner surface
76 Radial surface
78 Radial surface
80 Flange
84 Inner surface
86 Radial surface
88 Radial surface
90 Liner
100 Liner
110 Bolts
120 Sleeve
122 Outer surface
124 Inner surface
126 Inner surface
128 Inner surface
DT1 Diameter
DT2 Diameter
RT1 Radius
RT2 Radius
RH1 Radius
RH2 Radius
A1 Arrow
A2 Arrow

What is claimed is:

1. A flexible pipe connector, comprising:
   a tubular housing, including:
      a first end having a first inner surface; and,
      a second end having a second inner surface;
   a first tubular member including a first spherical end and a first cylindrical end, the first spherical end pivotably arranged in the first end;
   a second tubular member including a second spherical end and a second cylindrical end, the second spherical end pivotably arranged in the second end;
   a first annular flange secured to the first end, the first annular flange arranged to secure the first spherical end within the first inner surface and having a first radially inward facing surface having a first constant radial diameter;
   a second annular flange secured to the second end and arranged to secure the second spherical end within the second inner surface and having a second radially inward facing surface having a second constant radial diameter; and,
   a first liner radially arranged between the first spherical end and the first annular flange.

2. The flexible pipe connector as recited in claim 1, wherein:
   the first end comprises a first radial surface having a first plurality of holes circumferentially arranged thereon; and,
   the first annular flange comprises a plurality of axial through-bores arranged circumferentially thereon, wherein the first annular flange is secured to the first end via a plurality of bolts.

3. The flexible pipe connector as recited in claim 1, further comprising a second liner radially arranged between the second spherical end and the second annular flange.

4. The flexible pipe connector as recited in claim 1, further comprising:
   a first connecting flange secured to a second distal end of the second cylindrical end; and,
   a second connecting flange secured to a second distal end of the second cylindrical end, wherein the first and second connecting flanges are operatively arranged to connect first and second tubular members with a third tubular member and a fourth tubular member, respectively.

5. A flexible pipe connector, comprising:
   a tubular housing including a first radial surface and a second radial surface, the first radial surface having a plurality of holes arranged circumferentially thereon;
   a sleeve arranged within the tubular housing, the sleeve including:
      a first end having a first spherical inner surface, the first spherical inner surface having a first inner radius; and,
      a second end having a second spherical inner surface, the second spherical inner surface having a second inner radius;
   a first tubular member including a first spherical end and a first cylindrical end, the first spherical end having a first outer radius, smaller than the first inner radius, the first spherical end pivotably arranged in the first end;
   a second tubular member including a second spherical end and a second cylindrical end, the second spherical end having a second outer radius, smaller than the second inner radius, the second spherical end pivotably arranged in the second end;

a first annular flange including a plurality of axial through-bores arranged circumferentially thereon, wherein the first annular flange is secured to the first radial surface via a plurality of bolts and arranged to secure the first spherical end within the first spherical inner surface; and, a second annular flange secured to the second radial surface and arranged to secure the second spherical end within the second spherical inner surface.

6. The flexible pipe connector as recited in claim 5, further comprising:

a first liner, operatively arranged between the first spherical end and the first flange; and, a second liner, operatively arranged between the second spherical end and the second flange.

7. The flexible pipe connector as recited in claim 5, wherein the sleeve is made of ultra high molecular weight polyethylene plastic.

8. The flexible pipe connector as recited in claim 5, wherein the first annular flange comprises a first radially inward facing surface and the second annular flange comprises a second radially inward facing surface, the first and second radially inward facing surfaces comprise a first and second constant radial diameter, respectively.

9. A flexible pipe connector, comprising:

a tubular housing including an open end and a closed end, the closed end having a first flange;

a sleeve arranged within the tubular housing, the sleeve including:

a first end having a first spherical inner surface, the first spherical inner surface having a first inner radius; and, a second end having a second spherical inner surface, the second spherical inner surface having a second inner radius;

a first tubular member including a first spherical end and a first cylindrical end, the first spherical end having a first outer radius, smaller than the first inner radius, the first spherical end pivotably arranged in the first end;

a second tubular member including a second spherical end and a second cylindrical end, the second spherical end having a second outer radius, smaller than the second inner radius, the second spherical end pivotably arranged in the second end;

a second flange removably connected to the open end;

a first liner arranged in the open end radially between the first spherical end and the first flange, the first liner extending out of the open end past the first flange in a first axial direction; and, a second liner arranged in the closed end radially between the second spherical end and the second flange, the second liner extending out of the closed end past the second flange in a second axial direction, opposite the first axial direction.

* * * * *